Figure 1:
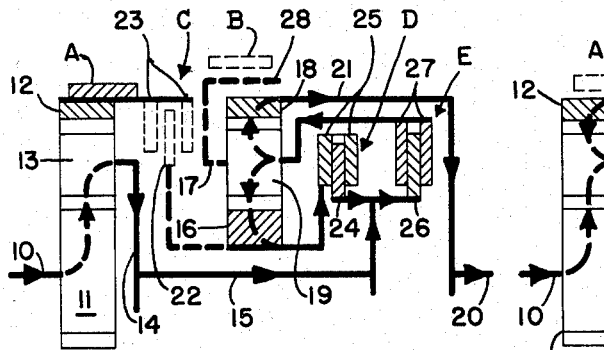

Feb. 17, 1959     H. W. SIMPSON     2,873,624
PLANETARY TRANSMISSION

Filed Aug. 26, 1957     2 Sheets-Sheet 1

INVENTOR.
Howard W. Simpson.

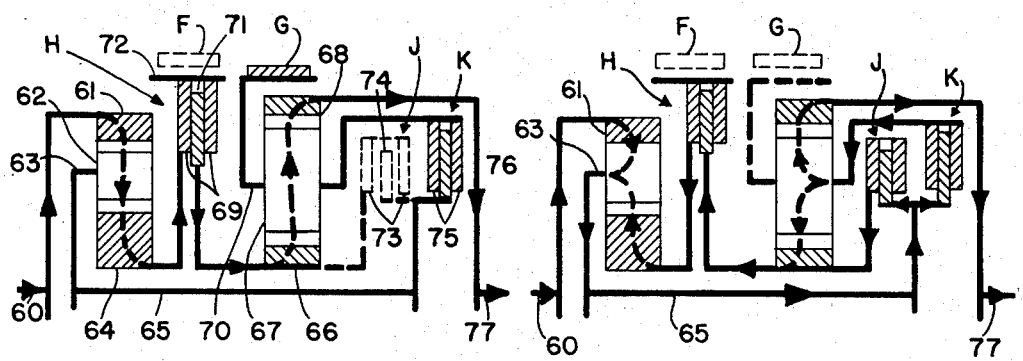
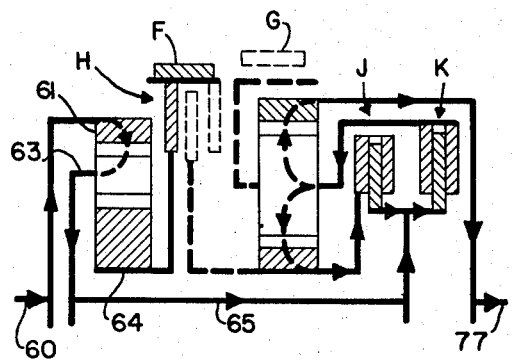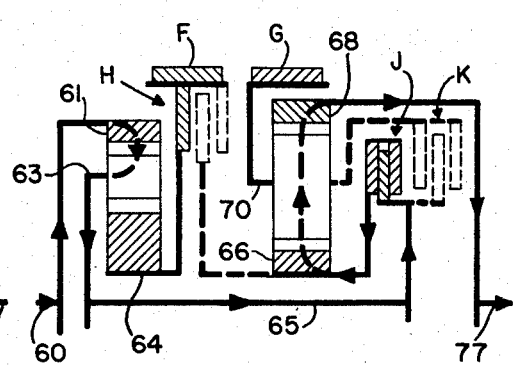
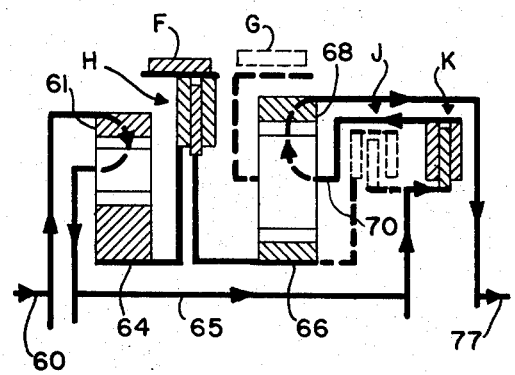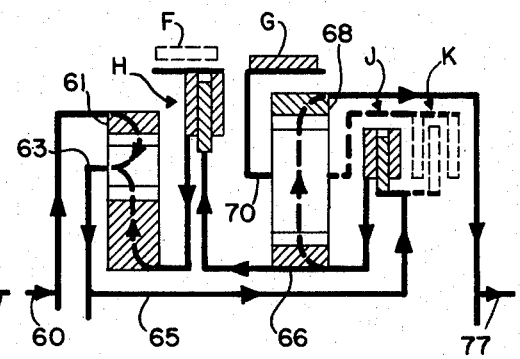
FIG. 5　　FIG. 8
FIG. 6　　FIG. 9
FIG. 7　　FIG. 10
INVENTOR.
Howard W. Simpson.

United States Patent Office 2,873,624
Patented Feb. 17, 1959

2,873,624

PLANETARY TRANSMISSION

Howard W. Simpson, Dearborn, Mich.

Application August 26, 1957, Serial No. 680,338

13 Claims. (Cl. 74—759)

This invention relates to a multi-speed transmission for self propelled vehicles and especially the off-road type, such as agricultural and industrial tractors, and those used in earth moving work. Such vehicles must have several travel speeds in both directions, but heretofore planetary transmissions for this purpose have been costly and cumbersome, as well as inefficient and prone to develop overheating when subjected to continuous and heavy loading.

The present invention avoids the above in a unique combination of planetary gearing together with suitable clutches and brakes, so that important new functions are achieved which overcome the above objections.

The main object of my invention is to provide a simple planetary transmission at low cost, yielding four properly spaced travel speeds forward and two in reverse, but requiring only two simple planetary gear sets.

Another object is to provide a planetary transmission having plate clutches running in oil which clutches, when released, have low plate differential speeds and therefore run relatively cool.

Another object is to eliminate the frictional drag of idling gears at all times except when in neutral, by locking them up in speeds in which they do not work. For instance, in three of the six speed ratios, both gear sets are working but in two of the other speeds only one gear set is working and in direct drive neither set is working. In each of these three speeds the non-working gears are prevented from idling by locking them up to rotate as a solid unit.

Another object is to provide a planetary transmission in which smooth speed changing occurs under continuous power output.

Another object is to arrange the two planetary gear sets so they can be coupled together in various ways to produce certain gear ratios and also to enable each set to be used singly to yield certain other gear ratios. For instance, both of the gear sets are coupled in compound relationship in three different ways, and each is also used separately for two additional speeds.

Another object is to arrange and locate braking means in relation to the gearing and clutches so that both brakes are capable of selectively holding either single or multiple reaction members.

These and other objects will become apparent from the following description together with accompanying simplified drawings which are partial elevations in section of two embodiments of my invention.

The drawings are shown in simplified form for the sake of clarity and the highly advanced state of the art will enable those skilled to design working models.

Figures 1 to 4 show respectively 1st, 2nd, 3rd, and 4th speed of an embodiment employing sun gear input.
Figures 1R and 2R show the same embodiment in 1st and 2nd reverse speeds.
Figures 5 to 10 show respectively 1st, 2nd, 3rd, 4th, 1st reverse and 2nd reverse of a second embodiment having ring gear input.

In all of the drawings the parts which carry loads are shown in full lines and the parts not working in dotted lines. The paths of torque through the transmission are shown by dotted lines and arrows. The clutches are shown by three plates to indicate multiple plate clutches having friction plates which are axially slideable.

The brakes are shown as rectangular cross sections of contracting bands on cylindrical drums in full lines when the brake band is engaged. The bands are shown off the drums and in dotted lines when released. The clutches and brakes are engaged by hydraulically operated servo cylinders but these are not shown as they are not a part of this invention and comprise structure known to those skilled in transmission art. Although only one planet gear per gear set is shown in the drawings two or more are used so as to balance the separating forces of the gears.

Figure 1R:
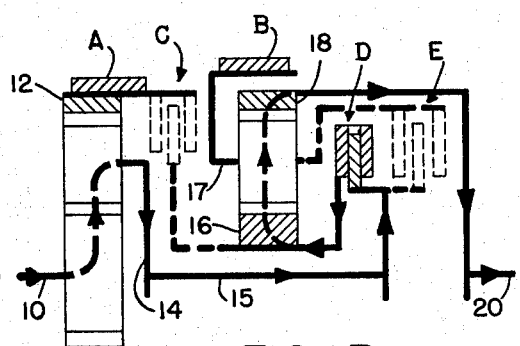

In Fig. 1 input shaft 10 drives sun gear 11 which meshes with planet gear 13 rotatably mounted on carrier 14. Ring gear 12 also meshes with planet gear 13.

Clutch C, shown released, has driving plates 23 and driven plate 22 and, when engaged, couples ring gear 12 to sun gear 16 which meshes with planet gear 19 which is rotatably mounted on carrier 17. Ring gear 18 also meshes with planet gears 19 and is connected to output shaft 20. Brake band A is shown engaging ring gear 12 and brake band B is shown disengaged from brake drum 28 which is integral with carrier 17.

Clutch D comprises driving plate 24 and driven plates 25 and when engaged as shown in Fig. 1, couples carrier 14 through shaft 15 to sun gear 16.

Clutch E comprises driving plate 26 and driven plates 27 and couples carrier 14 to carrier 17 through shaft 15 when engaged.

Referring to Fig. 5, input shaft 60 drives ring gear 61 which meshes with planet gear 62 which is rotatably mounted on carrier 63. Sun gear 64 meshes with planet gear 62 and is coupled to sun gear 66 by clutch H which is shown engaged.

Clutch H comprises driving plates 69, drum 72 and driven plate 71. Sun gear 66 meshes with planet gear 67 which is rotatably mounted on carrier 70. Ring gear 68 meshes with planet gear 67 and is connected to output shaft 77. Clutch J comprises driving plate 74 and driven plates 73 and when engaged couples carrier 63 to sun gear 66 through shaft 65. Clutch K comprises driving plate 76 and driven plates 75 and couples carriers 63 and 70. Brake band F engages drum 72 which is integral with sun gear 64. Brake band G engages to hold carrier 70.

*Operation—sun gear input*

In first speed, Fig. 1, brake band A holds ring gear 12 as a reaction member which forces carrier 14 to rotate forwardly at reduced speed. Clutches D and E are engaged as shown which locks sun gear 16 to carrier 17 and thus turns ring gear 18 and output shaft 20 at the same speed as carrier 14. Clutch C is released as shown in dotted lines.

Figure 2:
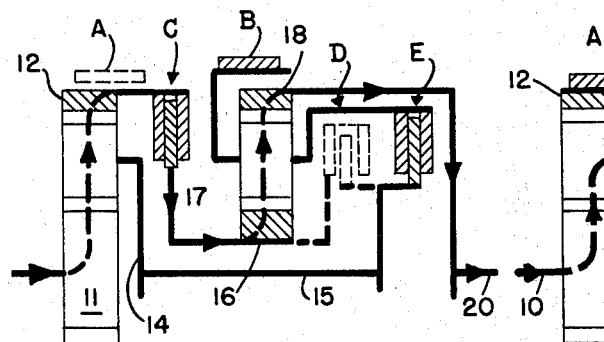
Figure 2R:
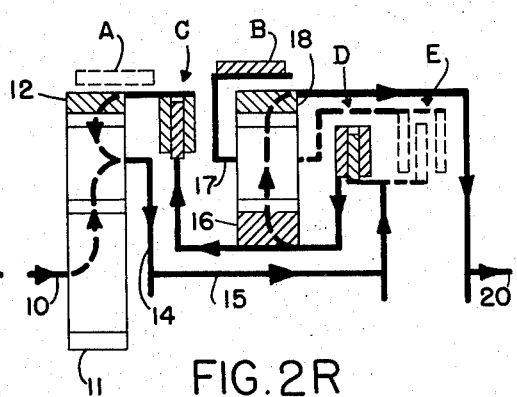

In 2nd speed, Fig. 2, clutches C and E are engaged and clutch D released. Brake band A is now released and brake band B applied to hold carriers 14 and 17 as reaction members. As a result ring gear 12 is driven backward by the forward rotation of sun gear 11, and sun gear 16 is driven backward by ring gear 12 through clutch C, but since carrier 17 is also held, ring gear 18 and output shaft 20 turn forward at reduced speed.

Figure 3:
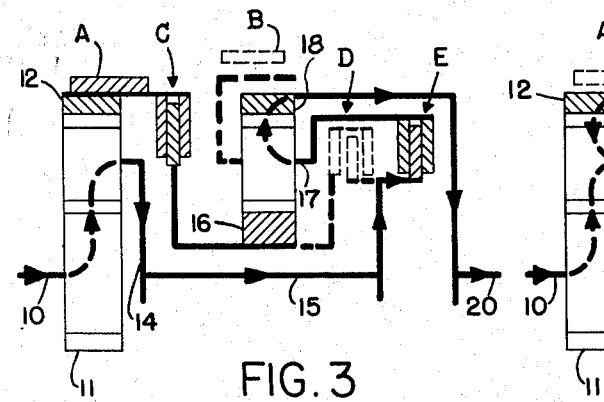

In 3rd speed, Fig. 3, the three clutches remain as in Fig. 2 but brake band B is now released and brake band A applied. This causes carrier 14 to turn forward the same as in Fig. 1 and it is coupled to carrier 17 by clutch E. Since clutch C is engaged, brake band A holds both ring gear 12 and sun gear 16 as reaction members. As a result ring gear 18 is overdriven to drive output shaft 20 at 3rd speed.

Figure 4:
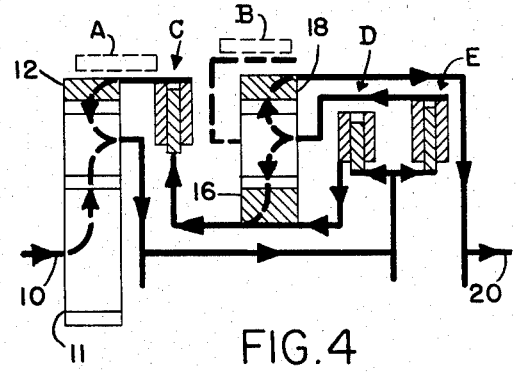

In 4th speed, Fig. 4, both brake bands A and B are released and clutches C, D and E are engaged. This locks up both gear sets in direct drive.

In first reverse speed, Fig. 1R, input shaft 10 drives sun gear 11 and carrier 14 is driven forwardly at reduced speed since ring gear 12 is held by brake band A. Sun gear 16 is released from ring gear 12 because clutch C is disengaged but is coupled to carrier 14 by clutch D being engaged. Brake band B holds carrier 17 as a reaction member and ring gear 18 and output shaft 20 are driven backward with the reduction of both gear sets compounded to provide a slow reverse.

In 2nd reverse, Fig. 2R, input shaft 10 drives sun gear 11, and since carrier 14 and ring gear 12 are locked together by clutches C and D which are engaged, sun gears 11 and 16 are also locked up to rotate at input speed. Carrier 17 is held by brake band B and ring gear 18 and output shaft 20 turn at a reverse speed but faster than 1st reverse.

A variety of gear ratios can be obtained with this gear train especially with sun gear input as described above. For instance, if each sun gear has half as many teeth as the ring gear of the same set, gear ratios of 4.0, 3.0, 2.0 and 1.0 to 1 are obtained in forward speeds and 6.0 and 2.0 to 1 in reverse. If each sun gear has two thirds as many teeth, forward ratios of 2.5, 2.25, 1.50, 1.0 to 1 and reverse ratios of 3.75 and 1.5 to 1 are obtained.

A 5 to 1 ratio selectively engageable range gear put in series with the gear train shown in Figs. 1–4 and Figs. 1R and 2R which produces the first set of the above ratios would result in 8 speeds forward and 2 in reverse. This would yield typical travel speeds of 1.0, 1.33, 2.0, 4.0, 5.0, 6.67, 10.0 and 20.0 M. P. H. forward, and .67, 2.0, 3.33 and 10.0 M. P. H. in reverse. With the second set of above ratios, a 3.33 to 1 range gear would result in typical travel speeds of 1.9, 2.1, 3.2, 4.8, 6.4, 7.1, 10.7 and 16.0 M. P. H. forward, and 1.3, 3.2, 4.3 and 10.7 M. P. H. in reverse.

*Operation—ring gear input*

In first speed, Fig. 5, carriers 63 and 70 are connected by clutch K and both are held stationary by brake band G. Ring gear 61 drives planet 62 which acts as an idler and sun gears 64 and 66, being connected by clutch H, are driven backward. Since carrier 70 is being held, ring gear 68 and output shaft 77 are driven forward at reduced speed.

In 2nd gear, Fig. 6, brake band F holds sun gear 64 as a reaction member and carrier 63 is driven forward at reduced speed. Clutches J and K are engaged and thereby couple carrier 63 to output shaft 77 through the right hand gear set.

In 3rd speed, Fig. 7, brake band F again holds sun gear 64 but clutch H is engaged and clutch J released. As a result both sun gears are held as reaction members and carrier 70 is driven by clutch K and ring gear 68 and output shaft 77 are driven at a speed faster than that of carrier 63 but slower than that of input shaft 60.

In 4th speed, Fig. 8, both gear sets are locked up to rotate as a unit by clutches H, J and K all being engaged.

In 1st reverse, Fig. 9, brake band F holds sun gear 64, and carrier 63 and shaft 65 are driven forward at the same reduced speed as in Figs. 6 and 7. Clutch J couples sun gear 66 to shaft 65 to also turn at the same reduced speed. Brake band G holds carrier 70, and then ring gear 68 and output shaft 77 are driven backward at a speed slower than that of sun gear 66.

In 2nd reverse, Fig. 10, the left hand gear set and sun gear 66 are locked up to rotate at input speed by clutches H and J and carrier 70 being held by brake band G, ring gear 68 and output shaft 77 are driven backward at a speed which is faster than 1st reverse speed.

Typical gear ratios obtained for ring gear input are 2.67, 1.67, 1.33 and 1.0 to 1 for 1st, 2nd, 3rd and 4th speeds, and 6.67 and 4.0 to 1 for first and second reverse speeds.

A selectively engageable range gear of 3.33 to 1 in series with the gear train shown in Figs. 5–10 would yield 8 ratios forward and 2 in reverse and give typical travel speeds of 1.5, 2.4, 3.0, 4.0, 5.0, 8.0, 10.0 and 13.33 M. P. H. forward, and .67, 1.0, 2.22 and 3.33 M. P. H. in reverse.

I claim:

1. In a variable speed transmission having input and output members, first and second planetary gear sets, each set having a sun gear, a ring gear, at least one planet gear meshing with said sun gear and with said ring gear, and a planet gear carrier, means for coupling the input member to a member of the first gear set, means for coupling the output member to the ring gear of the second gear set, releasable means for coupling the carrier members of each gear set together, releasable means for coupling the sun gear of the second gear set to the carrier of the first gear set and releasable means for holding a third member of the first gear set as a reaction member.

2. In a variable speed transmission having input and output members, first and second planetary gear sets, each set having a sun gear, a ring gear, at least one planet gear meshing with said sun gear and with said ring gear, and a planet gear carrier, means for coupling the input member to a member of the first gear set, means for coupling the output member to the ring gear of the second gear set, releasable means for coupling said carriers of each set together, releasable means for coupling a third member of the first gear set with the sun gear of the second set together and releasable means for holding both carriers stationary.

3. In a variable speed transmission having input and output members, first and second planetary gear sets having a sun gear, a ring gear, at least one planet gear meshing with said sun gear and with said ring gear, and a planet gear carrier, means for coupling the input member to a first member of the first gear set, means for coupling the output member to the ring gear of the second gear set, releasable means for coupling said carriers of each gear set together, releasable means for coupling the sun gear of the second gear set to one of said carriers and releasable brake means for holding a third member of said first gear set as a reaction member.

4. In a variable speed transmission having input and output members, first and second planetary gear sets, each set having a sun gear, a ring gear, at least one planet gear meshing with said sun gear and with said ring gear, and a planet gear carrier, means for coupling the input member to a member of the first gear set, means for coupling the output member to the ring gear of the second gear set, releasable means for coupling the first set carrier to the second set sun, releasable means for coupling said second set sun to a third member of the first set, and releasable means for holding said second set carrier stationary.

5. The combination set forth in claim 4 and a brake for holding said third member as a reaction member.

6. In a variable speed transmission having input and output members, first and second planetary gear sets, each set having a sun gear, a ring gear, at least one planet gear meshing with said sun gear and with said ring gear, and a planet gear carrier, means for coupling the input member to a member of the first gear set, means for coupling the output member to the ring gear of the second gear set, releasable means for coupling the carriers of each gear set together, releasable means for coupling the sun and carrier members of the second set together, and a brake for holding a third member of the first gear set as a reaction member.

7. In the combination set forth in claim 4, a brake for holding said third member of the first gear set.

8. In the combination set forth in claim 6, a brake for holding the carrier of the second gear set.

9. In a variable speed transmission having input and output shaft, a first planetary gear set including a member driven by the input shaft, a reaction gear, planet gears each meshing with said member driven by the input shaft and also with said reaction gear, and a planet gear carrier; a second planetary gear set including a ring gear coupled at all times to the output shaft, a sun gear, planet gears each meshing with said sun gear and also with said ring gear, and a planet gear carrier; releasable brake means for holding said reaction gear, releasable brake means for holding the planet carrier of the second gear set, releasable clutch means for selectively coupling said sun gear to the carrier of the first gear set, to the reaction member of the first gear set, or to the carrier of the second gear set, said clutch and brake means selectively operable to establish a plurality of speed ratios between the input and output shafts.

10. In a variable speed transmission having input and output shafts, a first planetary gear set having a member driven by the input shaft, a reaction gear, planet gears each meshing with said member driven by the input shaft and also with said reaction gear, and a planet gear carrier; a second planetary gear set including a ring gear coupled at all times to rotate with the output shaft, a sun gear, planet gears each meshing with said sun gear and also with said ring gear, and a planet gear carrier; releasable brake means for holding said reaction gear, releasable brake means for holding the carrier of the second gear set, releasable clutch means for selectively coupling the carrier of the second gear set to the sun gear of the second gear set or to the carrier of the first set, and releasable clutch means for coupling said sun gear and reaction gear together, said clutch and brake means being operable to establish a plurality of speed ratios between the input and output shafts.

11. In a variable speed transmission having input and output members, first and second planetary gear sets, each set having a sun gear, a ring gear, at least one planet gear meshing with said sun gear and with said ring gear, and a planet gear carrier, a member of the first gear set being coupled at all times to the input member and the ring gear of the second gear set being coupled at all times to the output member, releasable dual clutch means for coupling the first set carrier optionally either to the second set carrier, to the second set sun gear, or to both; releasable brake means for holding the second set carrier as a reaction member, and releasable clutch means for coupling a third member of the first gear set to the sun gear of the second set.

12. In a variable speed transmission having input and output members, first and second planetary gear sets, each set having a sun gear, a ring gear, at least one planet gear meshing with said sun gear and with said ring gear, and a planet gear carrier, a member of the first gear set being coupled at all times to the input member and the ring gear of the second gear set being coupled at all times to the output member, releasable dual clutch means for coupling the first set carrier optionally either to the second set carrier, to the second set sun gear, or to both; releasable clutch means for coupling a third member of the first gear set to the sun gear of the second set, and releasable brake means for holding optionally one or both of last mentioned members.

13. The combination set forth in claim 12 and releasable brake means for holding the second set carrier as a reaction member.

References Cited in the file of this patent

UNITED STATES PATENTS

| 2,722,141 | Swift | Nov. 1, 1955 |

FOREIGN PATENTS

| 614,340 | France | Sept. 14, 1926 |
| 712,527 | Germany | Oct. 21, 1941 |